(12) United States Patent
Bourbon

(10) Patent No.: US 7,097,555 B2
(45) Date of Patent: Aug. 29, 2006

(54) VENTILATOR PARTICULARLY FOR MOTOR VEHICLES

(75) Inventor: Claude Bourbon, Molinges (FR)

(73) Assignee: Bourbon Automobile, Saint Lupicin (FR)

(*) Notice: Subject to any disclaimer, the term of this patent is extended or adjusted under 35 U.S.C. 154(b) by 225 days.

(21) Appl. No.: 10/468,104

(22) PCT Filed: Feb. 15, 2002

(86) PCT No.: PCT/FR02/00569
§ 371 (c)(1),
(2), (4) Date: Oct. 21, 2003

(87) PCT Pub. No.: WO02/066274
PCT Pub. Date: Aug. 29, 2002

(65) Prior Publication Data
US 2004/0067729 A1  Apr. 8, 2004

(30) Foreign Application Priority Data
Feb. 16, 2001 (FR) .................................. 01 02189

(51) Int. Cl.
B60H 3/00 (2006.01)
(52) U.S. Cl. .................. 454/157; 454/152; 422/123
(58) Field of Classification Search ........... 454/152, 454/155, 157; 422/123, 124
See application file for complete search history.

(56) References Cited

U.S. PATENT DOCUMENTS

| | | | | |
|---|---|---|---|---|
| 24,936 A | * | 8/1859 | Perkins | 42/10 |
| 1,962,217 A | | 6/1934 | Schwager | |
| 2,213,018 A | * | 8/1940 | Perkins | 237/8 A |
| 2,867,866 A | * | 1/1959 | Steele | 422/124 |
| 4,722,264 A | * | 2/1988 | DeGuisseppe | 454/157 |
| 4,813,344 A | * | 3/1989 | Greif | 454/156 |
| 5,297,988 A | * | 3/1994 | Nishino et al. | 454/75 |
| 6,932,331 B1 | * | 8/2005 | Fan | 261/30 |
| 2004/0072532 A1 | * | 4/2004 | Cho | 454/155 |

FOREIGN PATENT DOCUMENTS

| | | |
|---|---|---|
| EP | 0 483 848 A2 | 5/1992 |
| EP | 2 841 184 | * 12/2003 |
| EP | 1 543 843 | * 6/2005 |
| WO | WO 01/00431 A1 | 1/2001 |

* cited by examiner

Primary Examiner—Gregory Wilson
(74) Attorney, Agent, or Firm—Oliff & Berridge, PLC

(57) ABSTRACT

According to the invention, the body (2) of the ventilator (1) defines at least one housing (5) behind the front face (12) of the ventilator (1), said housing communicating with the vent (1) tube (10) by means of one or more openings (17). Each housing (5) is intended to receive one or more scent spraying elements. The ventilator (1) comprises closing means (31) that are designed to prevent each housing (5) communicating with said tube (10) when in a first position and to allow said communication when in a second position. Furthermore, the ventilator (1) comprises means for controlling (31a) said closing means (31) which can be ventilator (1).

16 Claims, 8 Drawing Sheets

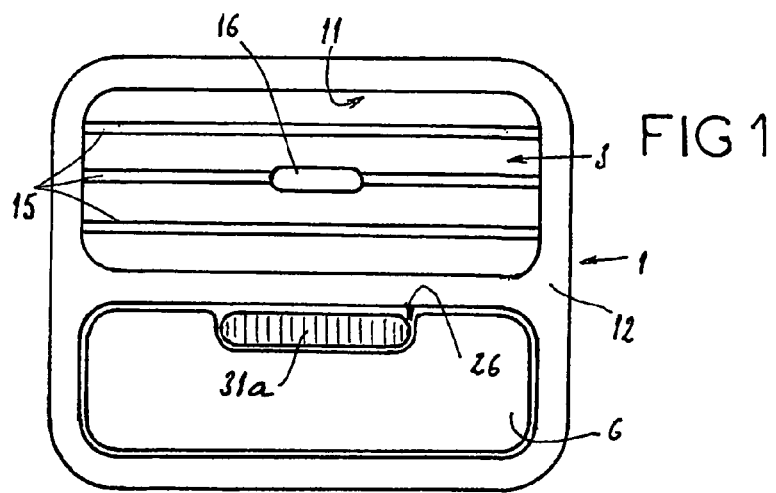
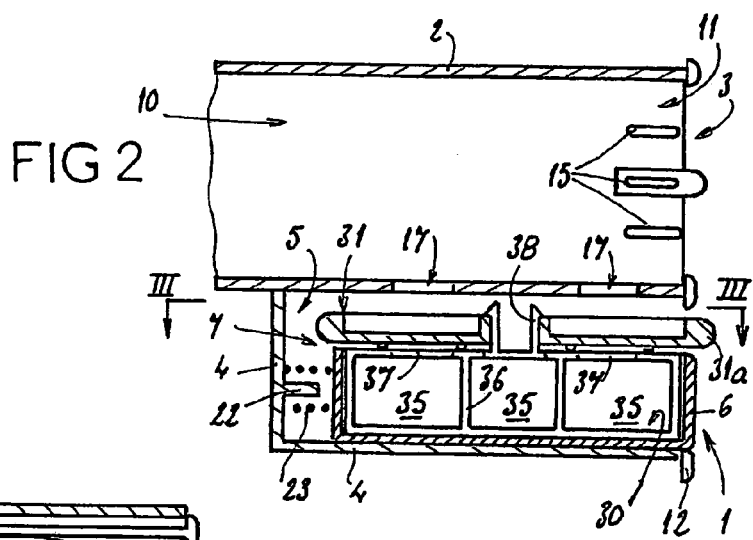
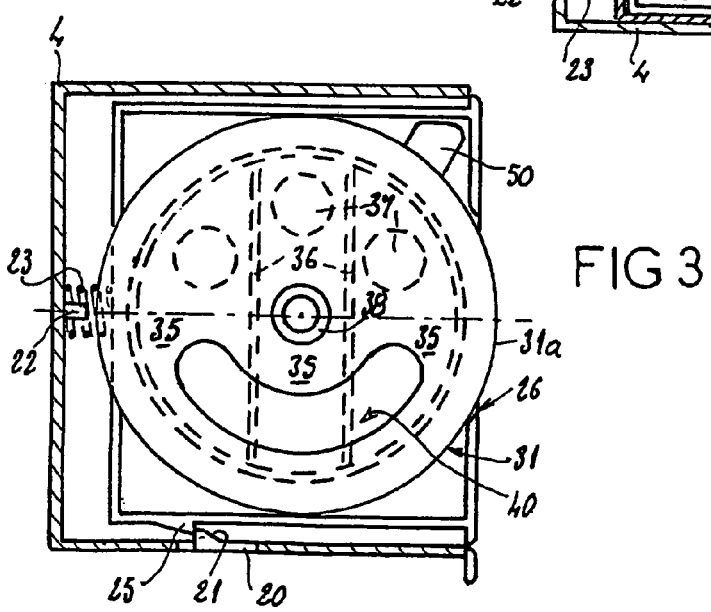
FIG 1
FIG 2
FIG 3

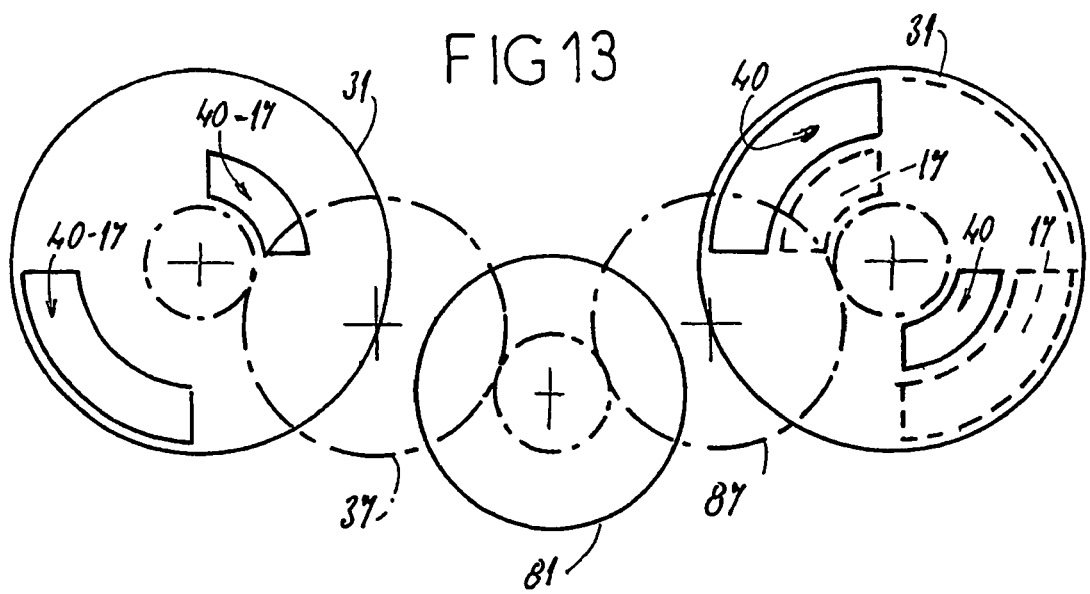
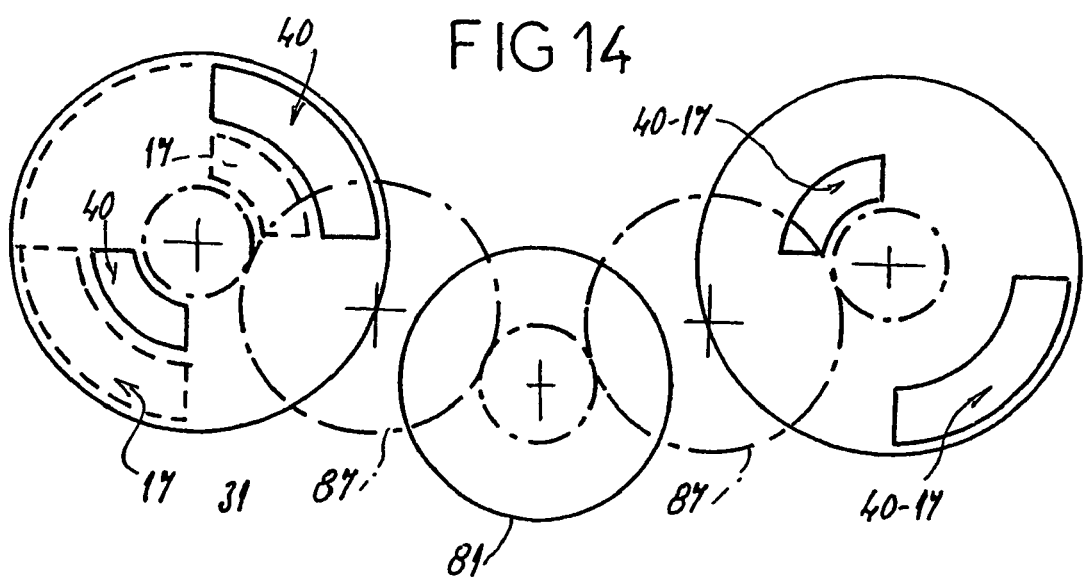

VENTILATOR PARTICULARLY FOR MOTOR VEHICLES

The present invention relates to a ventilator, particularly for motor vehicles.

It is known practice for the air flowing around the cabin of a motor vehicle to be scented by placing a scent-diffusing device on at least one of the ventilators that ventilates this cabin.

One existing diffusion device comprises a casing pierced with holes, containing one or several scent-diffusing elements and means engaging with one of the fins that the ventilation nozzle has, or that can be inserted between two of these fins to allow the casing to be mounted on the outside of the ventilator.

Such a device has the disadvantage of not being very easy to use. Fitting it onto the ventilator causes a normally careful driver to have to stop his vehicle.

Another disadvantage of this device is that it considerably impedes the air flow through the ventilator, both while it is being used and while it is not in use when left in place on this ventilator.

Furthermore, such a device is not attractive and this is very often a prohibitive disadvantage as far as potential users are concerned.

The present invention sets out to remedy all these disadvantages.

Its prime objective is to provide a simple ventilator that is easy to use, that is to say that does not force a driver to stop his vehicle in order to manipulate it and to do so while at the same time maintaining excellent efficiency as to the diffusion of scent.

Another objective of the invention is to provide a ventilator that allows good air flow even when the diffusion of scent is deactivated.

An additional objective of the invention is to provide a ventilator that maintains a layout and look similar to those of an existing ventilator, and a structure not really any different from that of an existing ventilator, so that it can be built from existing parts.

The ventilator concerned comprises, in a way known per se, a body which delimits a duct for conveying air and an opening for diffusing air, opening at a front face of the ventilator, it being possible for this opening to be equipped with a component for orientating the air flow, such as a grating or a nozzle.

According to the invention, the body delimits, behind said front face, at least one housing which communicates with said duct via one or more openings, each housing being intended to accommodate one or more scent-diffusing elements;

the ventilator comprises closure means shaped to make it possible, in a first position, to prevent communication between each housing and said duct and, in a second position, to allow this communication, and the ventilator comprises control means for operating said closure means, these control means being accessible from said front face of the ventilator.

Each housing containing the scent-diffusing element or elements is situated behind said front face, at the duct delimited by the ventilator, and is therefore not visible to the user. The aforesaid closure means can be operated very simply and easily, at this same front face; they allow the diffusion of scent to be activated or deactivated or the intensity with which scent is diffused to be adjusted.

Furthermore, the ventilator has, at this front face, an appearance identical or very similar to that of an existing ventilator, except for the presence of said control means.

Advantageously, each housing is formed outside said duct so that the ventilator has an air flow rate that remains substantially the same whether the scent diffusion is activated or deactivated.

As a preference, each housing has an opening allowing the scent-diffusing element or elements to be interchanged, so as to allow these elements to be interchanged or make this interchanging easier.

This opening may be formed at said front face and each housing may accommodate a drawer in which said scent-diffusing element or elements is or are placed. The ventilator may then advantageously comprise retaining means for keeping each drawer in the closed position, and means for releasing these retaining means.

As a preference, said closure means comprise a pivoting disk placed between the scent-diffusing element or elements and said opening or openings via which each housing communicates with the duct; this disk is pierced with at least one opening able, when the disk is in one angular position, to come into coincidence with a corresponding communicating opening and, when the disk is in another angular position, to be angularly offset from this communication opening so as to prevent this communication.

This closure means thus has a structure that is simple and inexpensive to manufacture.

The disk or the body of the ventilator may comprise sealing means to ensure a perfect seal between said duct and said scent-diffusing element or elements.

Advantageously, the front face of the ventilator has an opening and the disk is arranged in such a way as to be engaged partially through this opening so that a part of it projects beyond said front face.

This protruding part forms a knob for pivoting the disk so that this disk also forms said control means.

Advantageously, the disk may comprise a radial projection able, when the disk is in one angular position, to release said retaining means that keep the drawer in the closed position.

This protrusion thus forms the aforesaid release means. It may be molded as one with the disk, and this contributes to limiting the cost of manufacture of the ventilator.

According to one possible embodiment of the invention, said retaining means comprise:

at least one tooth formed on the drawer, and at least one flexible tab formed in at least a wall of the body delimiting the housing, this flexible tab being provided with a boss which forms a tooth able to collaborate with the tooth of the drawer to keep this drawer in the closed position, this tab being able to move between a locking position in which said teeth collaborate, and an unlocking position in which the tooth that it comprises is retracted so that it does not engage with the tooth of the drawer.

The aforesaid protrusion bears against this tab to release the sliding of the drawer toward its open position.

Elastic means are advantageously provided to bring the drawer into an open position.

The ventilator according to the invention may comprise at least two independent housings and control means specific to each housing. It may equally comprise at least two independent housings and single control means for simultaneously actuating the respective closure means of these housings.

In this second case, according to one possibility, these single control means are shaped to simultaneously cause the respective closure means of the housings to move into said first position or into said second position, and vice versa.

These single control means thus make it possible to obtain diffusion of scent through the various housings simultaneously, thus making it possible either to increase the intensity of the diffusion of one and the same scent, or to combine several different scents.

According to another possibility, said single control means are shaped to simultaneously cause the closure means of one housing to move into said first position and the closure means of another housing to move into said second position, and vice versa.

One housing may then contain one or more elements for diffusing a given scent and the other housing may contain one or more elements for diffusing another scent. The user thus has the choice between two different scents.

According to one preferred embodiment of the invention in this case,
- the control means comprise a knob projecting from the front face of the ventilator, rotating integrally with a pinion;
- the closure means of each housing comprise a pivoting disk placed between the scent-diffusing element or elements and said opening or openings via which each housing communicates with the duct; this disk is pierced with at least one opening able, when the disk is in one angular position, to come into coincidence with a corresponding communication opening and, when the disk is in another angular position, to be angularly offset from this communication opening so as to prevent this communication, the disk being secured to a pinion which meshes directly or indirectly with that of the knob, and
- the openings of the disks of the two housings and the openings via which the housings communicate with the duct of the ventilator are arranged in such a way that, when each opening of a disk comes into coincidence with a corresponding communication opening, each opening of the other disk is not in coincidence with the corresponding communication opening.

For a good understanding thereof, the invention is described once again hereinbelow with reference to the attached diagrammatic drawing which, by way of nonlimiting examples, depicts several possible embodiments of the ventilator to which this invention relates.

FIG. 1 is a face-on view thereof, from its front face, according to a first embodiment;

FIG. 2 is a side view thereof, in longitudinal section;

FIG. 3 is a view thereof from above, in section along III—III of FIG. 2;

FIG. 13 is a view of the ventilator similar to FIG. 9, in a different operating position than the one depicted in this FIG. 9;

FIG. 14 is a view of the ventilator similar to FIG. 9, in a different operating position than those depicted in FIGS. 9 and 13;

Figure 5:
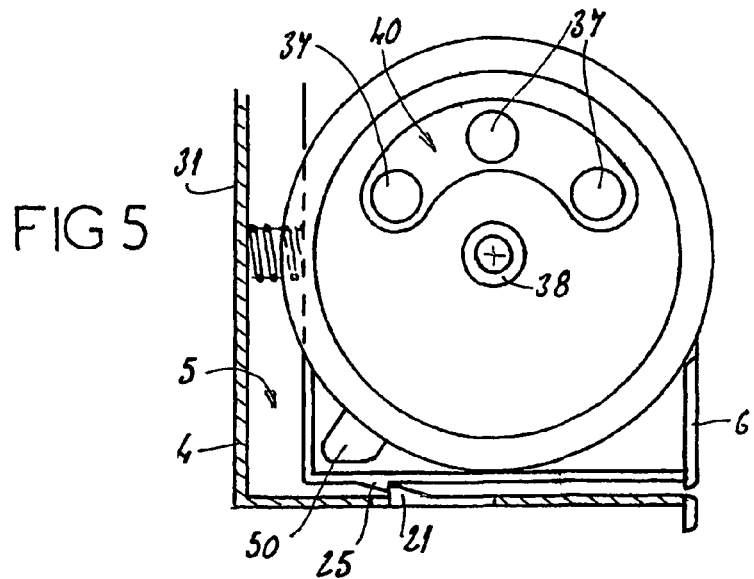
FIGS. 4 to 6 are views thereof similar to FIG. 3, in three different operating positions.

For simplification, those elements or parts of elements that are found again from one embodiment to another are denoted by the same numerical references.

FIGS. 1 to 6 depict, from various angles, a ventilator 1, particularly for motor vehicles.

This ventilator 1 comprises a body 2, an air diffusion grating 3, walls 4 delimiting, with the body 2, a housing 5, a drawer 6 slidably engaged in this housing 5, and a casing 7 accommodating scent-diffusing elements.

The body 2 delimits a duct 10 for conveying air and an opening 11 for diffusing air, opening onto the front face 12 of the ventilator 1, that is to say the face visible from the cabin of the vehicle.

The grating 3 is placed at this opening 11 to allow the air flow to be oriented. For this purpose and according to a technique well known per se, this grating 3 comprises pivoting fins 15 connected together by a connecting rod (not depicted). The orientation of these fins 15 is controlled by a button 16 projecting slightly beyond the face 12.

The body 2 also has, at its wall facing toward the housing 5, openings 17 via which this housing 5 communicates with the duct 10.

The walls 4 are secured to the body 2 and may in particular be molded as an integral part of the latter in synthetic material. They comprise two side walls, a rear wall (with respect to the face 12) and a lower wall. These walls 4 are perpendicular one to the next so that the housing 5 has a parallelepipedal overall shape.

This housing 5 opens into the face 12 via an opening formed therein.

As FIG. 3 shows, one of the side walls 4 comprises a flexible tab 20 provided with a boss 21 which forms a clip-fastening tooth. This tab 20 has elastic flexibility such that it can move between an internal position, shown in FIG. 3, and an external position, shown in FIG. 6.

The rear wall 4 comprises a peg 22 on which a helical spring 23 is engaged.

The side-wall of the drawer 6 situated on the same side as the wall 4 comprising the tab 20 has a clip-fastening tooth 25. This tooth 25 is able to collaborate with the boss 21 of this tab 20 to allow the drawer 6 to be kept in a closed position, as shown in FIG. 3.

The front face of the drawer 6 has a cutout 26 formed in its central region, and the rear wall of this drawer 6 compresses the spring 23 in said closed position.

The casing 7 comprises a receptacle 30 and a disk 31 mounted to pivot at the upper face of this receptacle 30.

The receptacle 30 has dimensions slightly smaller than the internal volume of the drawer 6, so that it is wedged longitudinally and laterally therein. It delimits three compartments 35 for housing scent-diffusing elements, these compartments being separated from one another by partitions 36. The upper face of the receptacle 30 has three openings 37 each of which opens into one of the compartments 35, these openings 37 allowing these compartments 35 to be filled with said scent-diffusing elements and then the diffusion of the scent.

The receptacle 30 further comprises a pivot 38 projecting from the center of its upper face, the free end of which has a snap-fixing collar. As the figures show, this pivot 38 is intended to accommodate the disk 31 and retain it by clip-fastening.

Figure 4:
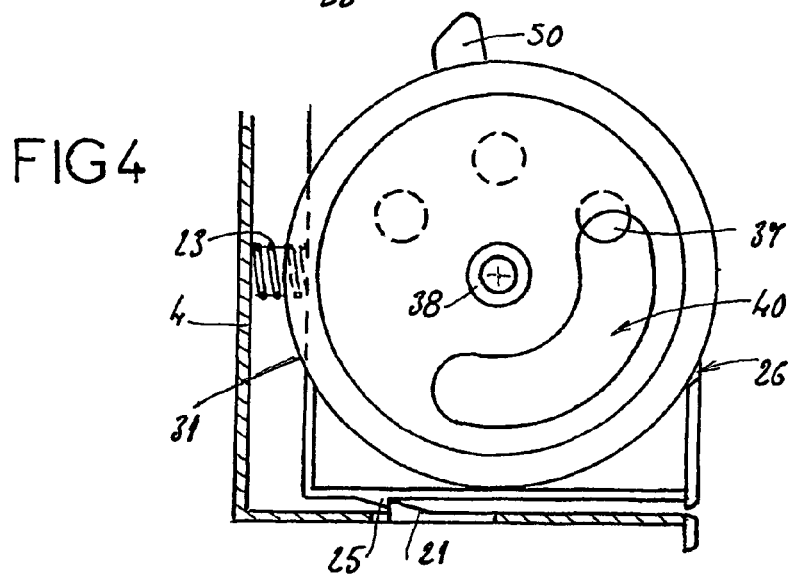

This disk 31 comprises an opening 40 of bowed shape, sized such that, when the disk 31 is in the position shown in FIG. 3, it is angularly offset from one or other of the openings 37 but so that when the disk 31 pivots, it can come into partial or complete coincidence with one, two or three of the openings 37, depending on the desired scent-diffusing intensity, as FIGS. 4 and 5 show.

The drawer 6, the receptacle 30, the pivot 38 and the disk 31 are sized and positioned in such a way that part 31a of the disk 31 is engaged through the cutout 26 and protrudes beyond the face 12. As can be gathered from reference to FIGS. 3 to 6, this projecting part 31a forms a knob for manually pivoting the disk 31.

FIG. 2 more especially shows that the lower face of the disk 31 comprises two sealing lips, one of which is shaped to entirely surround the opening 40 and the other of which is shaped to entirely surround the three openings 37 when the disk 31 is in the position shown in FIG. 3.

When the disk 31 is in this position, these lips seal the receptacle 30 closed to prevent any scent from being diffused.

These lips may in particular be produced by overmolding a flexible synthetic material on the corresponding face of the disk 31.

Figure 6:
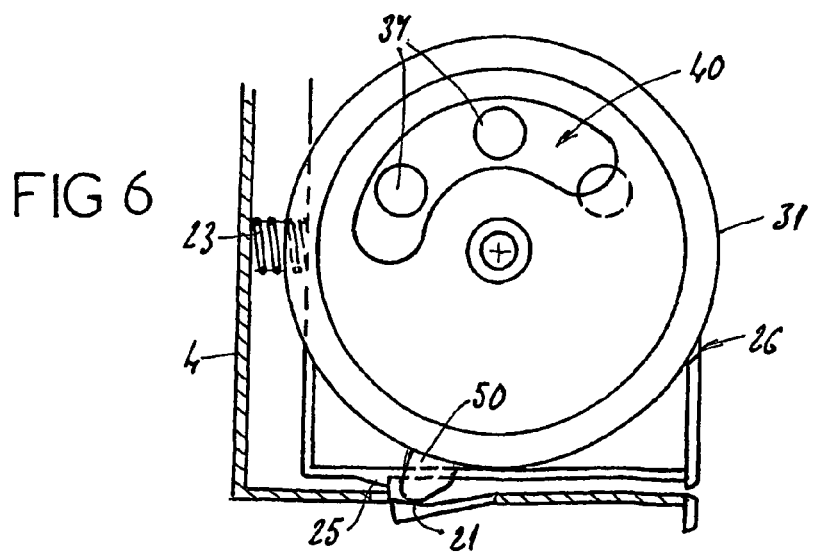

The disk also comprises a radial projection 50 sized to encounter the boss 21 of the tab 20 when the disk 31 is in the angular position shown in FIG. 6.

In practical terms, as can be understood from reference to FIGS. 3 to 6, the user can actuate the part 31a of the disk 31 to place this disk 31 either in the shut-off position shown in FIG. 3, in which no scent is diffused, or in the wide open position shown in FIG. 5, when maximum diffusion of scent is desired, or in an infinite number of intermediate positions, one of which is shown in FIG. 4, allowing this same intensity to be adjusted.

Pivoting the disk 31 into the position shown in FIG. 6 allows the boss 21 to be moved aside by the projection 50 coming to bear against this boss 21 or against the tab 20 and therefore allows the drawer 6 to be released to allow it to slide into a position out of the housing 5. The drawer 6 can then be extracted from this housing 5 so that the casing 7 can be replaced or refilled when the scent-diffusing elements have been used up or when the user wishes to change the scent.

Figure 7:
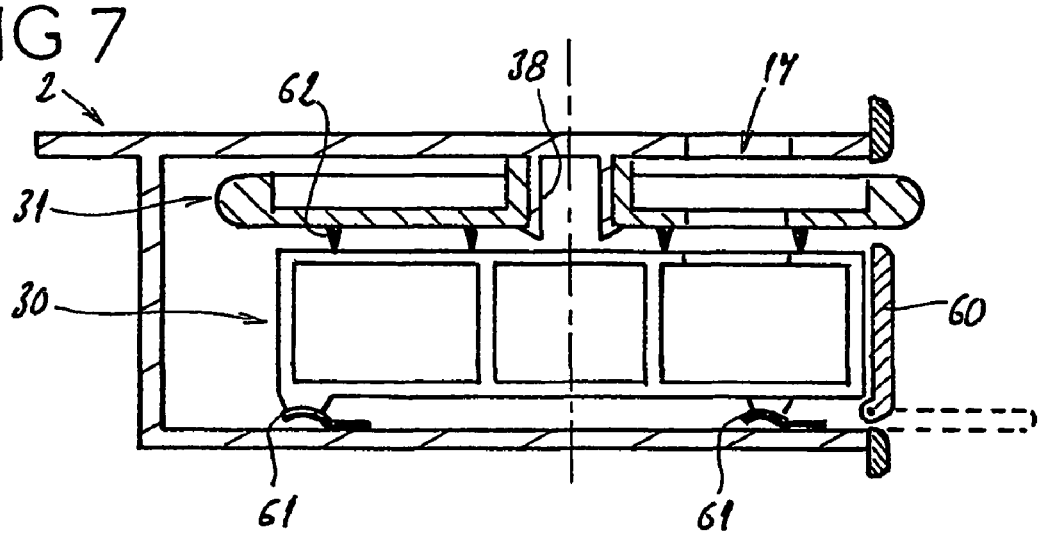
FIG. 7 is a side view thereof, in longitudinal section, according to a second embodiment.

FIG. 7 depicts a second embodiment of the ventilator 1 according to the invention.

In this case, the pivot 38 is formed at the wall of the body 2 comprising the openings 17 and projects into the housing 5. It accommodates the disk 31 by clip-fastening.

The housing 5 is closed on the front face by a pivoting wall 60. This wall 60 can move between a closed position depicted in solid line, in which it closes the housing 5, and an open position depicted in broken line, in which it allows the receptacle 30 to be introduced into the housing 5. Leaf springs 61 are provided to press the receptacle 30 against the sealing lips 62 that the disk 31 has.

Figure 8:
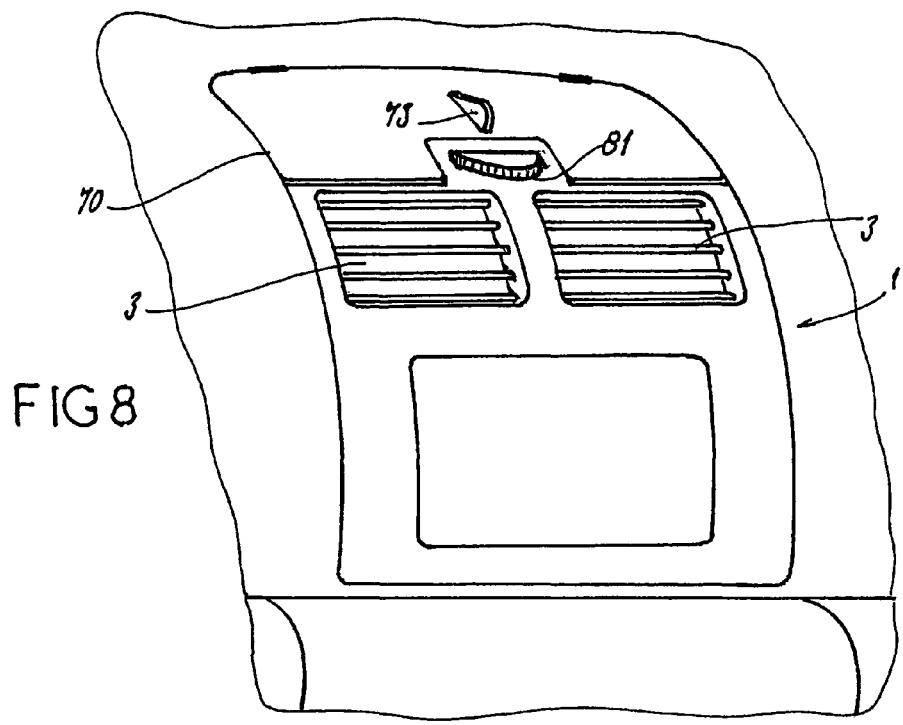
FIG. 8 is a perspective view thereof according to a third embodiment.

FIG. 8 depicts the ventilator 1 according to a third embodiment, which is a cabin central ventilator, comprising gratings 3 side by side and a casing situated above these gratings 3, closed by a pivoting flap 70.

Figure 10:
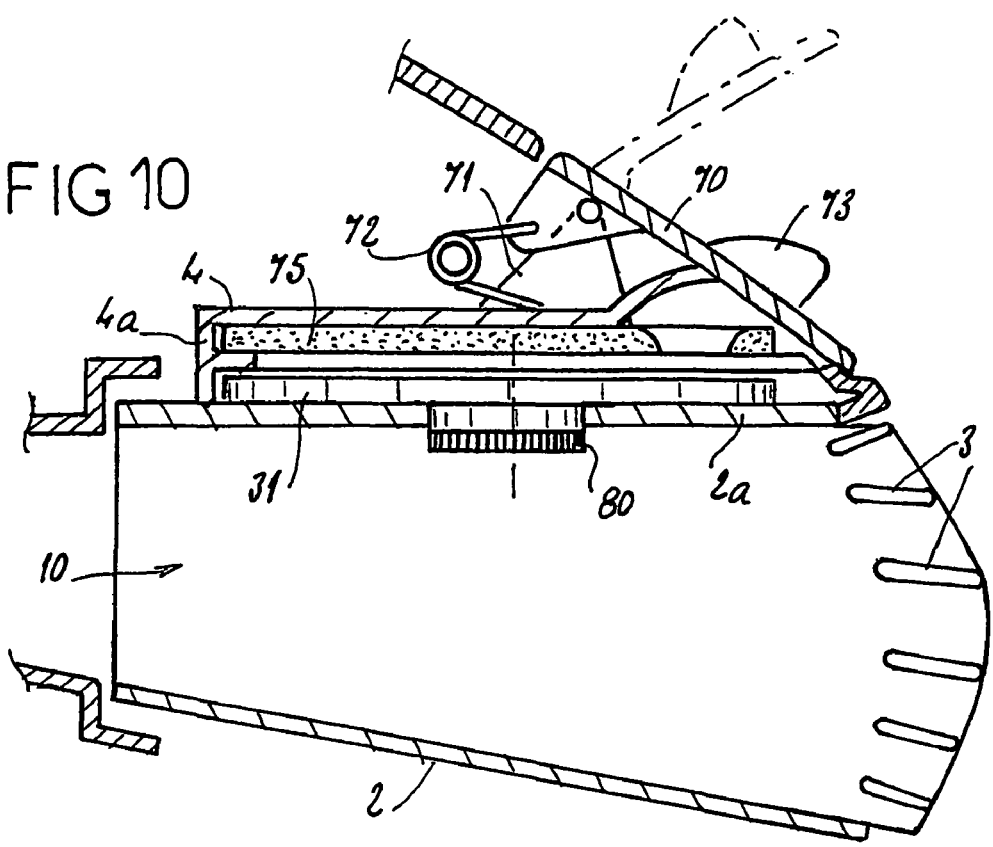
FIGS. 10 to 12 are part views of this ventilator, in section on X—X, XI—XI and XII—XII of FIG. 9, respectively.

As FIG. 10 shows, this flap 70 is mounted to pivot on lateral tabs 71 secured to the body 2 and is connected to a hairpin spring 72. This connection is bistable which means that the flap 70 can be held either in an open position or in a closed position. A boss 73 makes the flap 70 easier to grasp.

Figure 9:
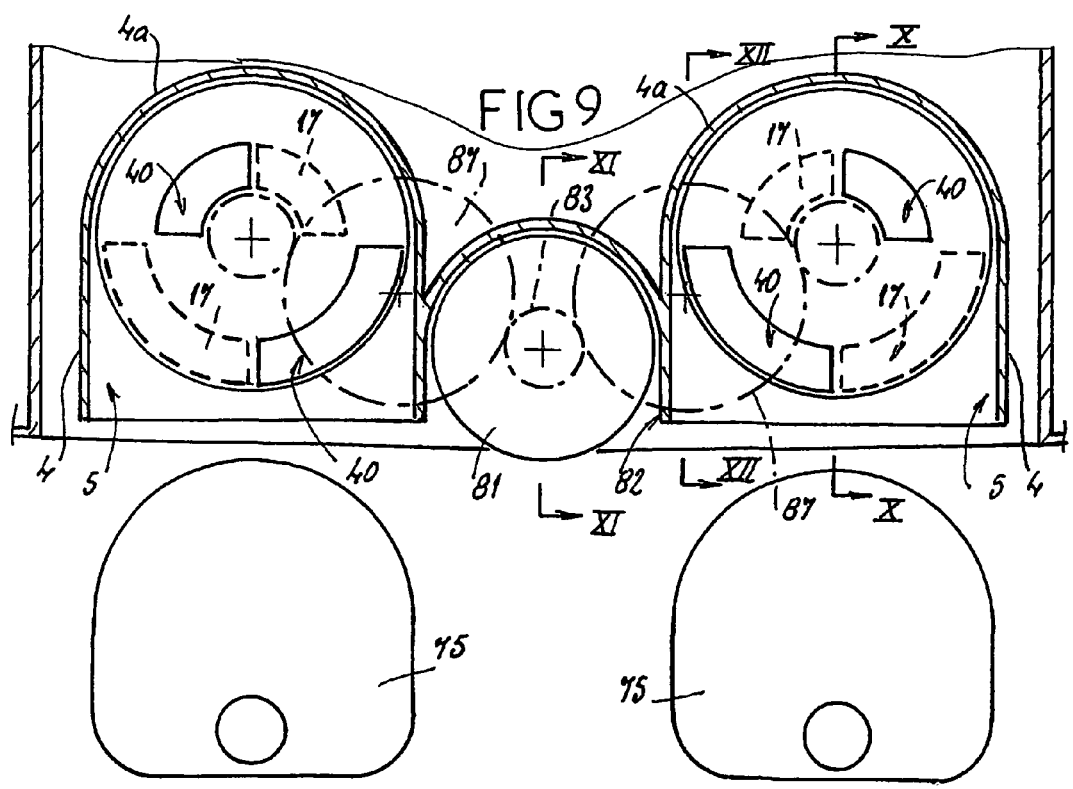
FIG. 9 is a view from above and in longitudinal section of the inside of a casing it contains according to this third embodiment.

It can be seen in FIG. 9 that the casing situated under this flap 70 comprises walls 4 delimiting two lateral housings 5 into which scent-diffusing elements 75 can be inserted, by sliding.

The wall 4a delimiting the rear of each housing 5 has a semicircular shape.

The wall 2a of the body 2 delimiting the closed end of each housing 5 has a hole formed more or less at the center of the circle coincident with the wall 4a, in which hole a disk 31 is mounted to pivot, and comprises two quarter-circle openings 17 arranged concentrically with respect to said circle. As FIG. 9 shows in chain line, these openings 17 are formed on diametrically opposed regions of this same circle, and one is arranged in the radially internal region of this circle while the other is arranged in the radially external region of this same circle.

FIG. 9 also shows that the openings 17 of a housing 5 are angularly offset by ninety degrees with respect to the openings 17 of the other housing 5.

It can be seen in FIG. 10 that each disk 31 has a central block 80 engaged through the aforesaid hole of a housing 5, until the disk 31 rests against the wall 2a. The part of this block 80 which, in this position, protrudes into the duct 10, has gear teeth and thus forms a pinion.

Furthermore, each disk 31 has two openings 40 with the same shapes and arrangements as the openings 17 of one same housing 5. These openings 40 may thus, when the disk 31 is in one angular position, come into coincidence with the openings 17 and allow the housing 5 to be placed in communication with the duct 10 or may, when the disk 31 is in another angular position, be offset from these openings 17 and prevent this communication.

Figure 11:
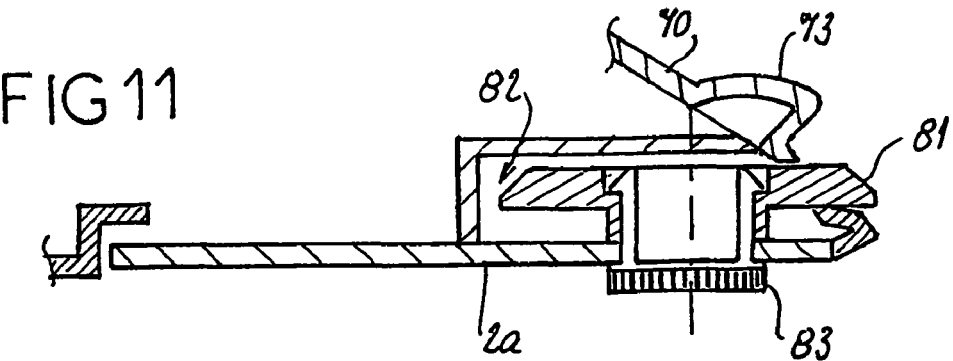

The ventilator 1 further comprises a central knob 81 projecting, as shown in FIG. 11, beyond the gratings 3. This knob 81 has a square central cavity defining an upper shoulder and is situated in a housing 82 that the casing forms. This central cavity may accommodate, through a hole in the wall 2a, a block 83 having a square part provided with a clip-fastening collar and a circular part forming a pinion, said clip-fastening collar locking behind said upper shoulder of the knob 81.

Engagement of the block 83 in said cavity thus allows the knob 81 to be mounted on the wall 2a.

Figure 12:
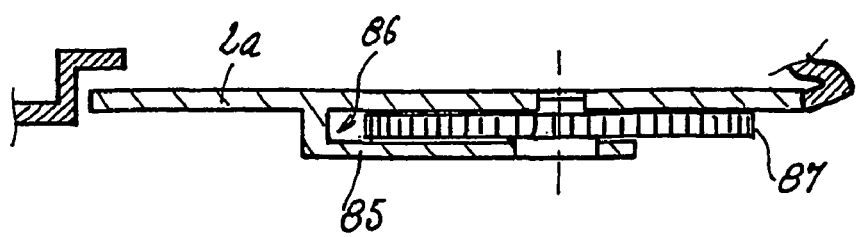

The ventilator 1 further comprises a lower wall 85 delimiting intermediate housings 86. This wall 85, together with the wall 2a, is pierced with two pairs of coaxial holes which, as can be seen in FIG. 12, allow the mounting of two gearwheels 87, one each side of the knob 81. One of these wheels 87 meshes with the pinion of the block 83 and with the pinion formed by the block 80 of a disk 31, and the other of these wheels 87 meshes with the pinion of the block 83 and with the pinion formed by the block 80 of the other disk 31.

As FIG. 9 shows, the disks 31 are set with respect to these wheels 87 in such a way that the openings 40 in the disks 31 are offset by ninety degrees from one disk 31 to the other.

In the position shown in FIG. 9, the openings 40 in the disks 31 are angularly offset from the openings 17 so that any communication of the housings 5 with the duct 10 is prevented.

Starting out from this position, the user can pivot the knob 81, for example in the clockwise direction in the example depicted, to bring the disks 31 into the position shown in FIG. 13. The openings 40 of the disk 31 situated to the left in this FIG. 13 then coincide with the openings 17, which means that a communication is established between the housing 5 concerned and the duct 10 so as to allow a scent to be diffused from this housing 5. At the same time, the openings 40 of the other disk 31 are offset from the corresponding openings 17, which means that no communication is established between the housing 5 situated on the right in this FIG. 13 and the duct 10.

The user can turn the knob 81 further in the same direction, until the disks 31 are brought into the position shown in FIG. 14: it is then the disk 31 situated to the right in this FIG. 14 which is in the position allowing communication between the corresponding housing 5 and the duct 10, this communication being prevented as far as the disk 31 situated to the left in FIG. 14 is concerned.

Figure 15:
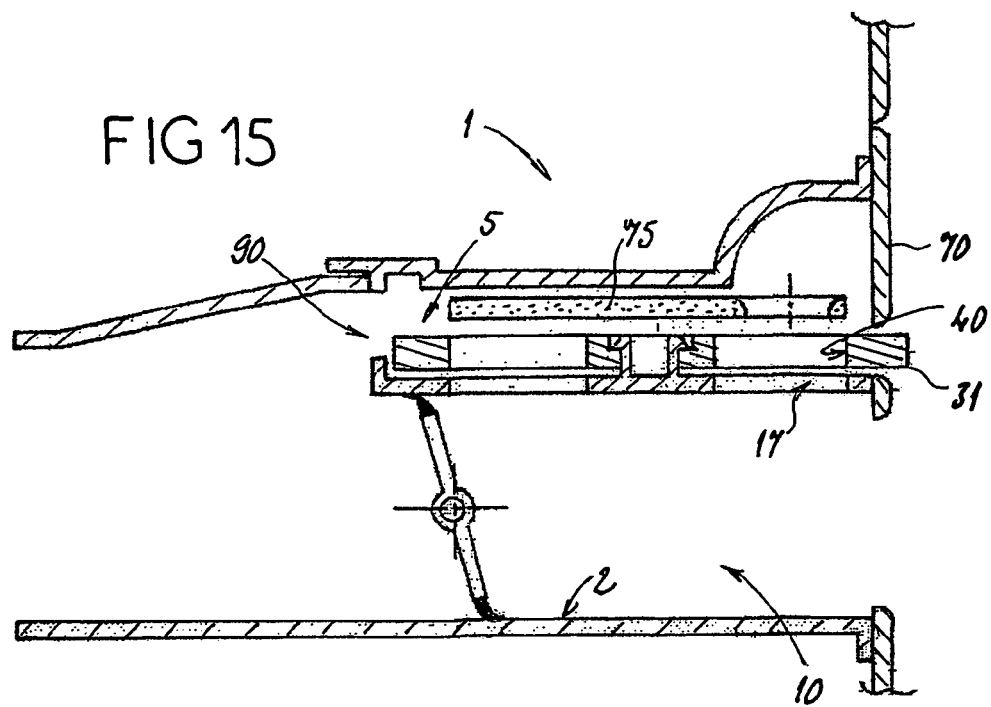
FIG. 15 is a side view, in longitudinal section, of the ventilator according to an alternative form of embodiment.

FIG. 15 shows that the housings 5 can communicate directly with the duct 10 via a rear opening 80, which means that part of the air flow passes through these housings 5, unlike in the exemplary embodiments of the ventilator 1 shown in FIGS. 1 to 14, in which embodiments these housings 5 are situated outside the duct 10 and communicate with the latter only via the openings 17.

Figure 16:
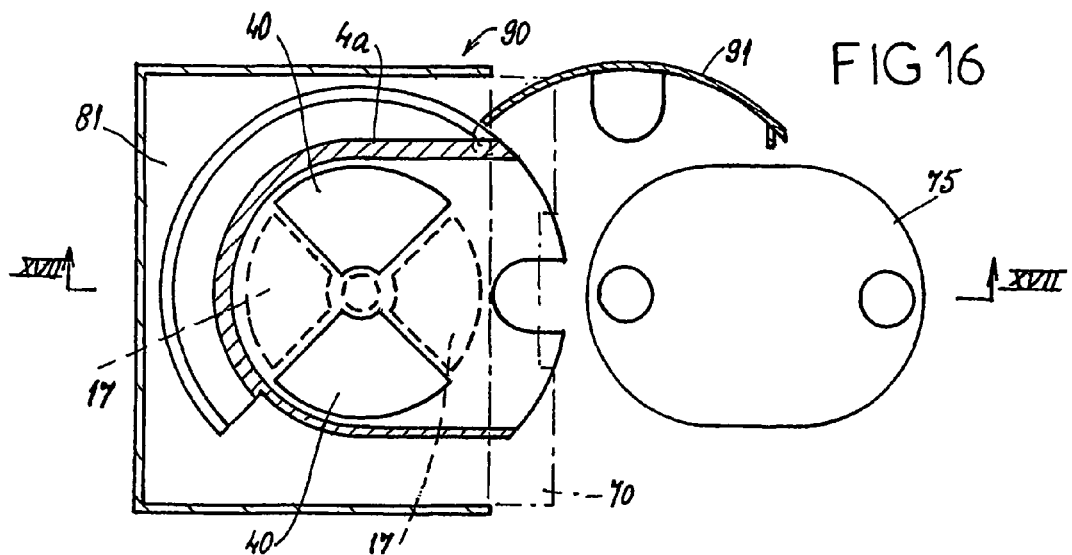
FIG. 16 is a view of the ventilator according to a fourth embodiment, in section on XVI—XVI of FIG. 17.
Figure 17:
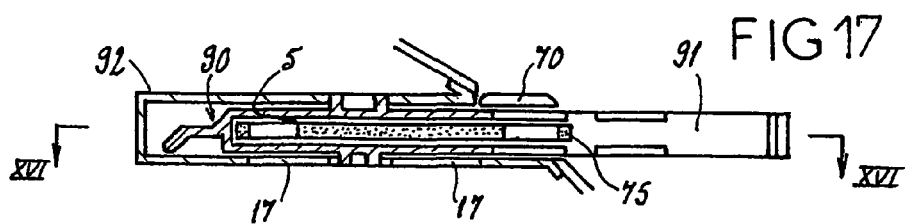
FIG. 17 is a side view thereof, on XVII—XVII of FIG. 16.

In the embodiment depicted in FIGS. 16 and 17, the ventilator comprises a pivoting assembly 90 having a U-shaped side wall 4a which, together with upper and lower walls, delimits the housing 5. The lower wall has the openings 40.

The housing 5 thus opens on one side of the pivoting assembly 90 to allow a scent-diffusing element 75 to be fitted into it, as shown in FIG. 16. To close this opening, the pivoting assembly 90 comprises an arm 91 mounted to pivot on the assembly 90 at one of the ends of the wall 4a and able to be clip-fastened onto the other end of this wall 4a as FIG. 18 shows.

It can be seen from FIGS. 16 and 17 that the pivoting assembly 90 is sized and positioned in such a way that, in the angular position shown in these figures, it protrudes beyond the receptacle 92 designed to accommodate it. As a result, in this position, the pivoting assembly 90 automatically lifts the flap 70 that closes the receptacle 92, thus making it easier to engage or extract the element 75.

The pivoting assembly 90 additionally comprises a curved lateral region forming a knob 81 allowing it to be pivoted. The knob 81 is not as tall as the assembly 90, and the flap 70 has a notch into which this knob 81 projects when this flap 70 is folded down to close the receptacle 92. This flap 70 thus moves into a folded down position when the assembly 90 is pivoted from the position shown in FIG. 16 to the position shown in FIG. 18.

Figure 18:
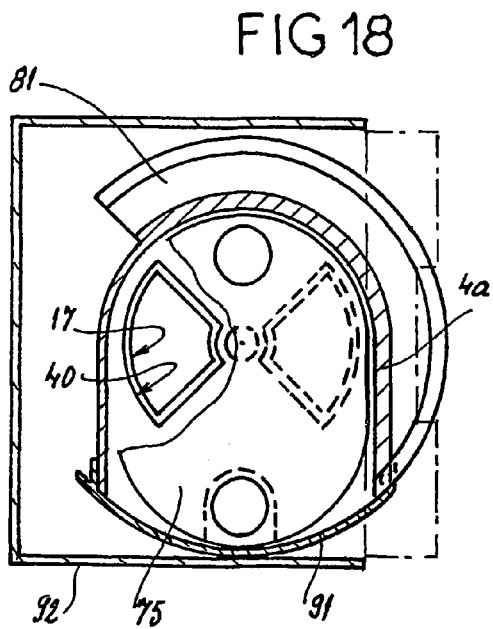
FIG. 18 is a view thereof similar to FIG. 16, in another operating position.

When the pivoting assembly 90 is in the position depicted in FIG. 18, which corresponds to a pivoting of this assembly in the clockwise direction through a quarter of a turn with respect to the position shown in FIG. 16, the openings 40 come into coincidence with the openings 17, so that scent can be diffused.

Figure 19:
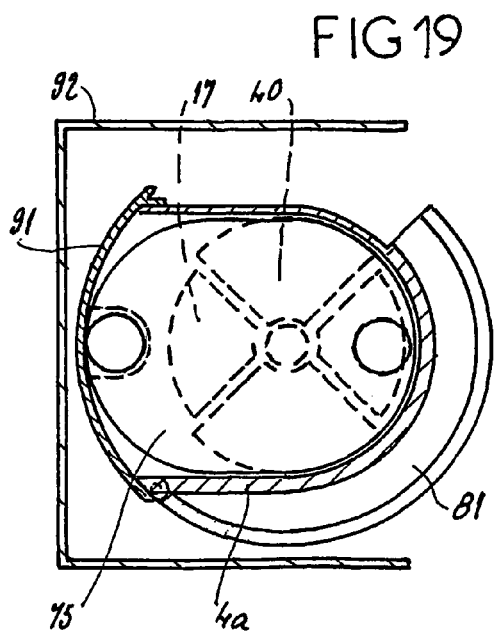
FIG. 19 is a view similar to FIG. 16, in yet another operating position.

In the position depicted in FIG. 19, which also corresponds to pivoting of the assembly 90 through a quarter of a turn with respect to the position shown in FIG. 18, the openings 40 are not in coincidence with the openings 17, allowing the diffusing of scent to be blocked.

As is evident from the foregoing, the invention provides a ventilator, particularly for motor vehicles, whose essential advantages are that it is simple and easy to use, that is to say that it does not force a driver to stop his vehicle in order to manipulate it, while at the same time maintaining a perfect seal as far as the diffusion of scent is concerned.

It goes without saying that the invention is not restricted to the exemplary embodiment described hereinabove by way of example but that, on the contrary, it encompasses all alternative forms of embodiment thereof covered by the attached claims. Thus, the knob 81 could be replaced by a control member of a different shape, such as a two-position or three-position (maximum degree of opening, minimum degree of opening, closure) push-button or a set of two or three independent buttons.

The invention claimed is:

1. A ventilator, comprising:
   a body that delimits a duct for conveying air and an opening for diffusing air, with the opening located at a front face of the ventilator and equipped with a component for orientating the air flow, wherein:
   the body delimits, behind said front face, at least one housing that communicates with said duct via one or more openings, each housing being structured to accommodate one or more scent-diffusing elements;
   the ventilator comprises closure means structured to, in a first position, prevent communication between said housing and said duct and, in a second position, to allow the communication, and
   the ventilator comprises control means for operating said closure means, the control means being accessible from said front face of the ventilator.

2. The ventilator as claimed in claim 1, wherein each housing is formed outside the duct so that the ventilator has an air flow rate that remains substantially the same whether scent diffusion is activated or deactivated.

3. The ventilator as claimed in claim 1, wherein each housing has an opening allowing the one or more scent-diffusing elements to be interchanged.

4. The ventilator as claimed in claim 3, wherein the opening for interchanging the one or more scent-diffusing elements is formed at said front face and in that each housing accommodates a drawer in which said one or more scent-diffusing elements are placed.

5. The ventilator as claimed in claim 4, further comprising retaining means for keeping each drawer in a closed position, and means for releasing the retaining means.

6. The ventilator as claimed in claim 5, wherein said retaining means comprise:
   at least one tooth formed on the drawer, and
   at least one flexible tab formed in at least a wall of the body delimiting the housing, the flexible tab being provided with a boss that forms a tooth able to collaborate with the tooth of the drawer to keep the drawer in the closed position, the tab being able to move between a locking position in which said teeth collaborate, and an unlocking position in which the tooth that the flexible tab comprises is retracted so that the tooth of the flexible tab does not engage with the tooth of the drawer.

7. The ventilator as claimed in claim 4, further comprising elastic means to bring the drawer into an open position.

8. The ventilator as claimed in claim 1, wherein said closure means comprise a pivoting disk placed between the one or more scent-diffusing elements and said opening or openings via which each housing communicates with the duct; the disk is pierced with at least one opening able, when the disk is in one angular position, to come into coincidence with a corresponding communication opening and, when the disk is in another angular position, to be angularly offset from the communication opening so as to prevent the communication.

9. The ventilator as claimed in claim 8, wherein the front face has an opening and in that the disk is arranged in such a way as to be engaged partially through the opening so that a part of the disk projects beyond said front face.

10. The ventilator as claimed in claim 8, wherein the disk comprises a radial projection able, when the disk is in one angular position, to release retaining means that keeps the drawer in the closed position.

11. The ventilator as claimed in claim 1, further comprising at least two independent housings and single control means for simultaneously actuating the respective closure means of the housings.

12. The ventilator as claimed in claim 11, wherein said single control means is shaped to simultaneously cause the respective closure means of the housings to move into said first position or said second position, and vice versa.

13. The ventilator as claimed in claim 11, wherein said single control means is shaped to simultaneously cause the closure means of one housing to move into said first position and the closure means of another housing to move into said second position, and vice versa.

14. The ventilator as claimed in claim 13, wherein:

the control means comprise a knob projecting from the front face of the ventilator, rotating integrally with a pinion;

the closure means of each housing comprises a pivoting disk placed between the one or more scent-diffusing elements and said opening or openings via which each housing communicates with the duct; the disk is pierced with at least one opening able, when the disk is in one angular position, to come into coincidence with a corresponding communication opening and, when the disk is in another angular position, to be angularly offset from the communication opening so as to prevent the communication, the disk being secured to a pinion which meshes directly or indirectly with that of the knob, and the openings of the disks of the two housings and the openings via which the housings communicate with the duct of the ventilator are arranged in such a way that, when each opening of a disk comes into coincidence with a corresponding communication opening, each opening of the other disk is not in coincidence with the corresponding communication opening.

15. A motor vehicle comprising the ventilator according to claim 1.

16. The ventilator as claimed in claim 1, wherein the component is a grating or a nozzle.

* * * * *